US012293559B2

(12) United States Patent
Soeseno et al.

(10) Patent No.: US 12,293,559 B2
(45) Date of Patent: May 6, 2025

(54) IMAGE DATA AUGMENTATION DEVICE AND METHOD

(71) Applicants: Inventec (Pudong) Technology Corporation, Shanghai (CN); INVENTEC CORPORATION, Taipei (TW)

(72) Inventors: Jonathan Hans Soeseno, Taipei (TW); Trista Pei-Chun Chen, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 460 days.

(21) Appl. No.: 17/819,302

(22) Filed: Aug. 11, 2022

(65) Prior Publication Data

US 2023/0401809 A1 Dec. 14, 2023

(30) Foreign Application Priority Data

Jun. 8, 2022 (CN) ......................... 202210643393.2

(51) Int. Cl.

| | |
|---|---|
| ***G06V 10/764*** | (2022.01) |
| ***G06T 7/70*** | (2017.01) |
| ***G06V 10/25*** | (2022.01) |
| ***G06V 10/74*** | (2022.01) |
| ***G06V 10/82*** | (2022.01) |

(52) U.S. Cl.

CPC ................ *G06V 10/25* (2022.01); *G06T 7/70* (2017.01); *G06V 10/761* (2022.01); *G06V 10/764* (2022.01); *G06V 10/82* (2022.01); *G06T 2207/20081* (2013.01); *G06T 2207/20084* (2013.01); *G06V 2201/07* (2022.01)

(58) Field of Classification Search

None

See application file for complete search history.

(56) References Cited

U.S. PATENT DOCUMENTS

| | | | | |
|---|---|---|---|---|
| 2017/0124409 | A1* | 5/2017 | Choi | G06V 10/25 |
| 2018/0089505 | A1* | 3/2018 | El-Khamy | G06N 3/045 |
| 2018/0181881 | A1* | 6/2018 | Du | G06N 3/08 |
| 2019/0130580 | A1* | 5/2019 | Chen | G06V 10/82 |
| 2020/0258254 | A1* | 8/2020 | Packwood | G06T 7/11 |
| 2021/0150283 | A1* | 5/2021 | Li | G06F 18/217 |

* cited by examiner

*Primary Examiner* — Tsung Yin Tsai

(74) *Attorney, Agent, or Firm* — CKC & Partners Co., LLC

(57) ABSTRACT

An image data augmentation device is provided, which comprises an image capturing circuit and a processor. The processor is configured to execute the following operations: using an object detection model to generate multiple bounding boxes and respective classification labels of the bounding boxes from an image; identifying an overlap ratio between the two bounding boxes, and determining whether the overlap ratio between the two bounding boxes is more than a ratio threshold, where the two bounding boxes have the same classification label; and when the overlap ratio between the two bounding boxes is more than the ratio threshold, deleting one of the two bounding boxes to update the bounding boxes, thereby by using the bounding boxes and the respective classification labels of the bounding boxes for executing machine learning.

5 Claims, 5 Drawing Sheets using the object detection model to generate multiple bounding boxes and respective classification labels of the multiple bounding boxes from the image — S210 identifying an overlap ratio between the two bounding boxes, and determining whether the overlap ratio between the two bounding boxes is more than a ratio threshold, where the two bounding boxes have the same classification label — S220 when the overlap ratio between the two bounding boxes is more than the ratio threshold, deleting one of the two bounding boxes to update the multiple bounding boxes, thereby using the multiple bounding boxes and the respective classification labels of the multiple bounding boxes for executing machine learning — S230

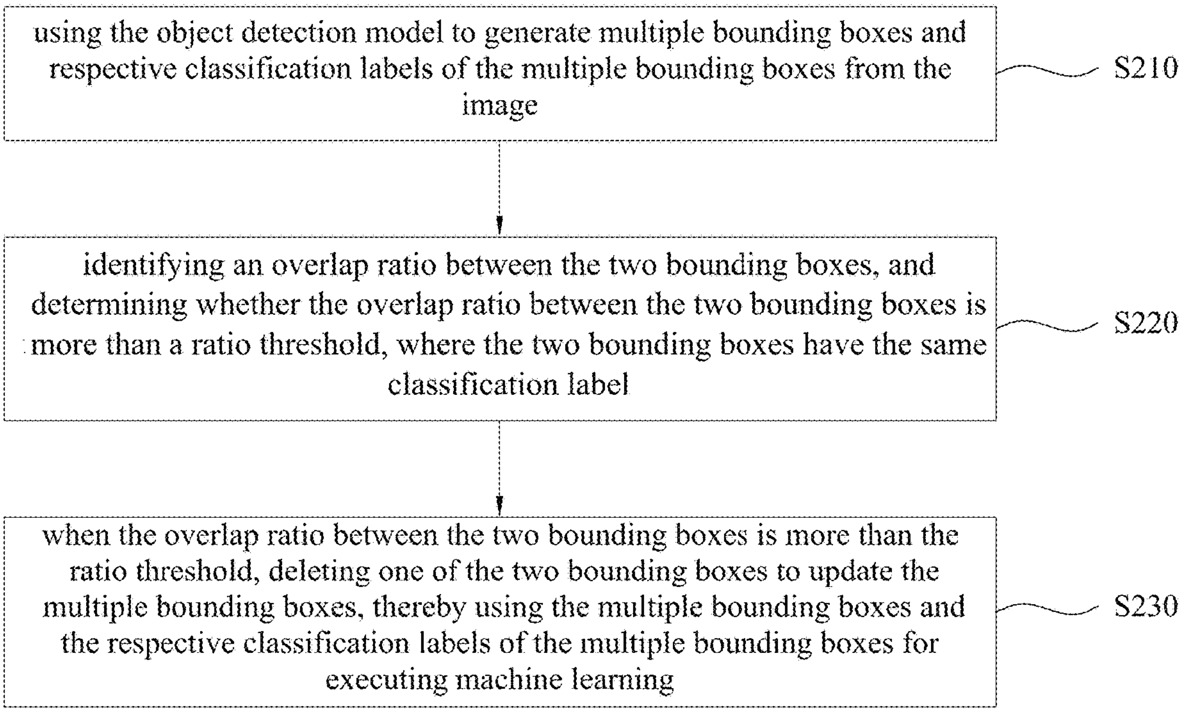

Fig. 2

IMAGE DATA AUGMENTATION DEVICE AND METHOD

CROSS-REFERENCE TO RELATED APPLICATION

This application claims priority to China Application Serial Number 202210643393.2, filed Jun. 8, 2022, which is herein incorporated by reference in its entirety.

BACKGROUND

Field of Disclosure

The present disclosure relates to a data augmentation technology, in particular, to an image data augmentation device and method.

Description of Related Art

In the prior art, when training a machine learning model, the most important thing is integrity of training data, in addition to the fact that the architecture of the trained model will affect the detection and recognition ability. For the same model architecture, a training database which is more diverse and complete, the detection ability of the model (i.e., higher accuracy) is higher. However, in practice, it is often impossible to collect a diverse and complete database due to limited manpower and data. Therefore, how to solve the problem of needing a lot of manpower to label images in the past is a problem that those skilled in the art are eager to solve.

SUMMARY

The disclosure provides an image data augmentation device, which comprises an image capturing circuit and a processor. The image capturing circuit is configured for capturing an image. The processor is connected to the image capturing circuit, configured for executing an object detection model, wherein the object detection model has a high recall rate, wherein the processor is configured for executing following operations: using the object detection model to generate a plurality of bounding boxes and respective classification labels of the plurality of bounding boxes from the image; identifying an overlap ratio between the two bounding boxes, and determining whether the overlap ratio between the two bounding boxes is more than a ratio threshold, wherein the two bounding boxes have the same classification label; and when the overlap ratio between the two bounding boxes is more than the ratio threshold, deleting one of the two bounding boxes to update the plurality of bounding boxes, thereby using the plurality of bounding boxes and the respective classification labels of the plurality of bounding boxes for executing machine learning.

The disclosure provides an image data augmentation method, which comprises: training an object detection model with a high recall rate according to an image, a plurality of first bounding boxes corresponding to the image and respective first classification labels of the plurality of first bounding boxes; using the object detection model to generate a plurality of second bounding boxes and respective second classification labels of the plurality of second bounding boxes from the image; using the plurality of first bounding boxes and the plurality of second bounding boxes as a plurality of prediction boxes, and using the plurality of first classification labels and the plurality of second classification labels as a plurality of prediction labels; identifying the overlap ratio between the two prediction boxes, and determining whether the overlap ratio between the two prediction boxes is more than a ratio threshold, wherein the two prediction boxes have the same prediction label; and when the overlap ratio between the two prediction boxes is more than the ratio threshold, deleting one of the two prediction boxes to update the prediction boxes, thereby using the plurality of prediction boxes and the plurality of prediction labels for executing machine learning.

The disclosure provides an image data augmentation method, which comprises: (a) training an object detection model with a high recall rate according to an image, a plurality of first bounding boxes corresponding to the image, and respective first classification labels of the plurality of first bounding boxes; (b) using the object detection model to generate a plurality of second bounding boxes and respective second classification labels of the plurality of second bounding boxes from the image; (c) using the plurality of first bounding boxes and the plurality of second bounding boxes as a plurality of prediction boxes, and using the plurality of first classification labels and the plurality of second classification labels as a plurality of prediction labels; (d) identifying the overlap ratio between the two prediction boxes, and determining whether the overlap ratio between the two prediction boxes is more than a ratio threshold, wherein the two prediction boxes have the same prediction label; (e) when the overlap ratio between the two prediction boxes is more than the ratio threshold, deleting one of the two prediction boxes to update the plurality of prediction boxes; (f) determining whether a recursive end condition has been met according to the plurality of prediction boxes and the plurality of prediction boxes before the update; (g) when the recursive end condition has been met, using the plurality of prediction boxes and the plurality of prediction labels for executing machine learning; and (h) when the recursive end condition is not met, using the plurality of predicted boxes as the plurality of second bounding boxes, and using the plurality of predicted labels as the plurality of second classification labels, so as to execute steps (c) to step (f).

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 2 is a flow chart of an image data augmentation method of the present disclosure.

DETAILED DESCRIPTION

Figure 1:
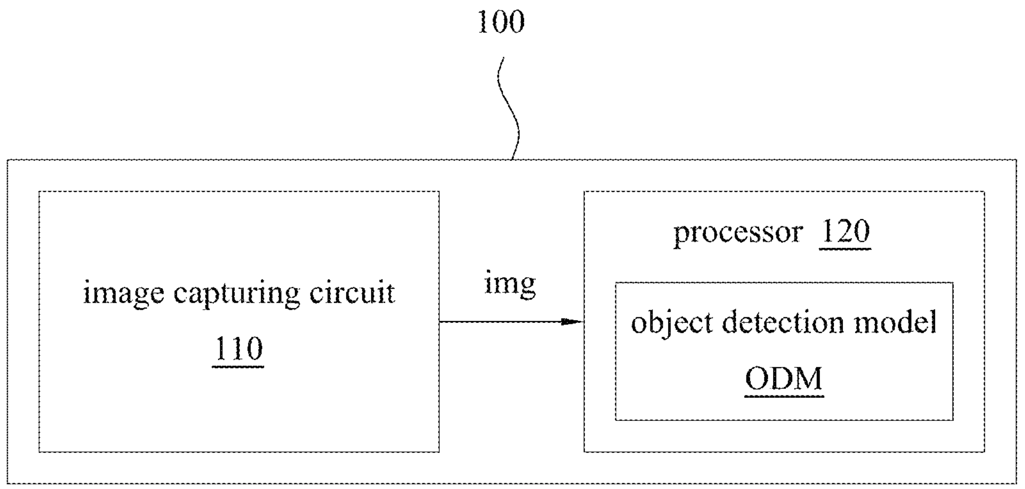
FIG. 1 is a block diagram of an image data augmentation device of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, which is a block diagram of an image data augmentation device 100 of the present disclosure. In this embodiment, the image data augmentation device 100 includes an image capturing circuit 110 and a processor 120. The image capturing circuit 110 is used for capturing an image img. The processor 120 is connected to the image capturing circuit 110.

In some embodiments, the image data augmentation device 100 can be established by a computer, a server or a processing center. In some embodiments, the image capture circuit 110 can be a video camera for capturing images or a camera capable of taking pictures continuously. For example, a digital single-lens reflex camera (DSLR), a digital video camera (DVC) or a near-infrared camera (NIRC), etc. In some embodiments, the processor 120 can be implemented by a processing unit, a central processing unit, or a computing unit.

In some embodiments, the image data augmentation device 100 is not limited to include the image capturing circuit 110 and the processor 120, and the image data augmentation device 100 can further include other components required for operation and application. For example, the image data augmentation device 100 can further include an output interface (e.g., a display panel for displaying information), an input interface (e.g., a touch panel, a keyboard, a microphone, a scanner, or a flash memory reader) and communication circuits (e.g., WiFi communication model, Bluetooth communication model, wireless telecommunication network communication model, etc.).

As shown in FIG. 1, the processor 120 executes an object detection model ODM based on a corresponding software or firmware command program.

In some embodiments, the processor 120 can further execute pre-training of the object detection model ODM based on the corresponding software or firmware instruction program. In some embodiments, the processor 120 can further use a large quantity of training images, corresponding bounding boxes and corresponding labels to pre-train the object identification model ODM with a high recall rate (i.e., a high detection rate). It should be noted that the object detection model ODM can be any type of model that can identify objects, and there is no particular limitation. For example, a faster region convolutional neural (faster R-CNN) network or you only look once (YOLO) network, etc.

In some embodiments, when the object detection model ODM is a faster R-CNN, the processor 120 can set a threshold for class scores of the bounding boxes to a lower value (e.g., set to 0.4 or set to a value less than 0.5), so as to train the object detection model ODM with the high recall rate. In some embodiments, when the object detection model ODM is the YOLO network, the processor 120 can set a threshold for class scores of predicted bounding boxes to a lower value (e.g., set to 0.3 or set to a value less than 0.5), and set a threshold for objectness scores of the predicted bounding boxes to a lower value (e.g., 0.4 or a value less than 0.5), so as to train the object detection model ODM with the high recall rate.

It should be noted that the class score indicates a probability that the predicted bounding box will be classified as an object of the corresponding prediction label, and the objectness score indicates a degree (i.e., intersection over union (IOU) (intersection area divided by union area)) of overlap between the predicted bounding box and the bounding box input to the object detection model ODM. In addition, the above-mentioned pre-training steps will generate the object detection model ODM that is relatively less likely to miss objects (but may not be as accurate in locations of the bounding boxes) to generate recommended bounding boxes and labels from the image img to be labeled.

Reference is made to FIG. 2, which is a flow chart of an image data augmentation method of the present disclosure. The method of the embodiment shown in FIG. 2 is applicable to the image data augmentation device 100 of FIG. 1, but is not limited thereto.

In this embodiment, the image data augmentation method includes steps S210 to S230, where the steps S210 to S230 are executed by the processor 120. Firstly, in step S210, using the object detection model ODM to generate multiple bounding boxes and respective classification labels of the multiple bounding boxes from the image img. In other words, the image img to be labeled is input into the object detection model ODM to identify the multiple bounding boxes and respective classification labels of the multiple bounding boxes from the image img.

Furthermore, in step S220, identifying an overlap ratio between the two bounding boxes, and determining whether the overlap ratio between the two bounding boxes is more than a ratio threshold, where the two bounding boxes have the same classification label. In some embodiments, an overlapping area between the two bounding boxes with the same classification label can be identified to calculate the IOU of the overlapping area, so as to use the IOU as an overlapping ratio. In some embodiments, the ratio threshold can be an IOU threshold.

Furthermore, in step S230, when the overlap ratio between the two bounding boxes is more than the ratio threshold, deleting one of the two bounding boxes to update the multiple bounding boxes, thereby using the multiple bounding boxes and the respective classification labels of the multiple bounding boxes for executing machine learning.

In some embodiments, class scores of the two bounding boxes can be compared, and the bounding box with the smaller class score can be deleted, where the class score indicates the probability that the corresponding bounding box is classified as an object of the classification label of the corresponding bounding box. In other embodiments, one of the two bounding boxes can be randomly selected, and the one of the two bounding boxes can be deleted.

Figure 3:
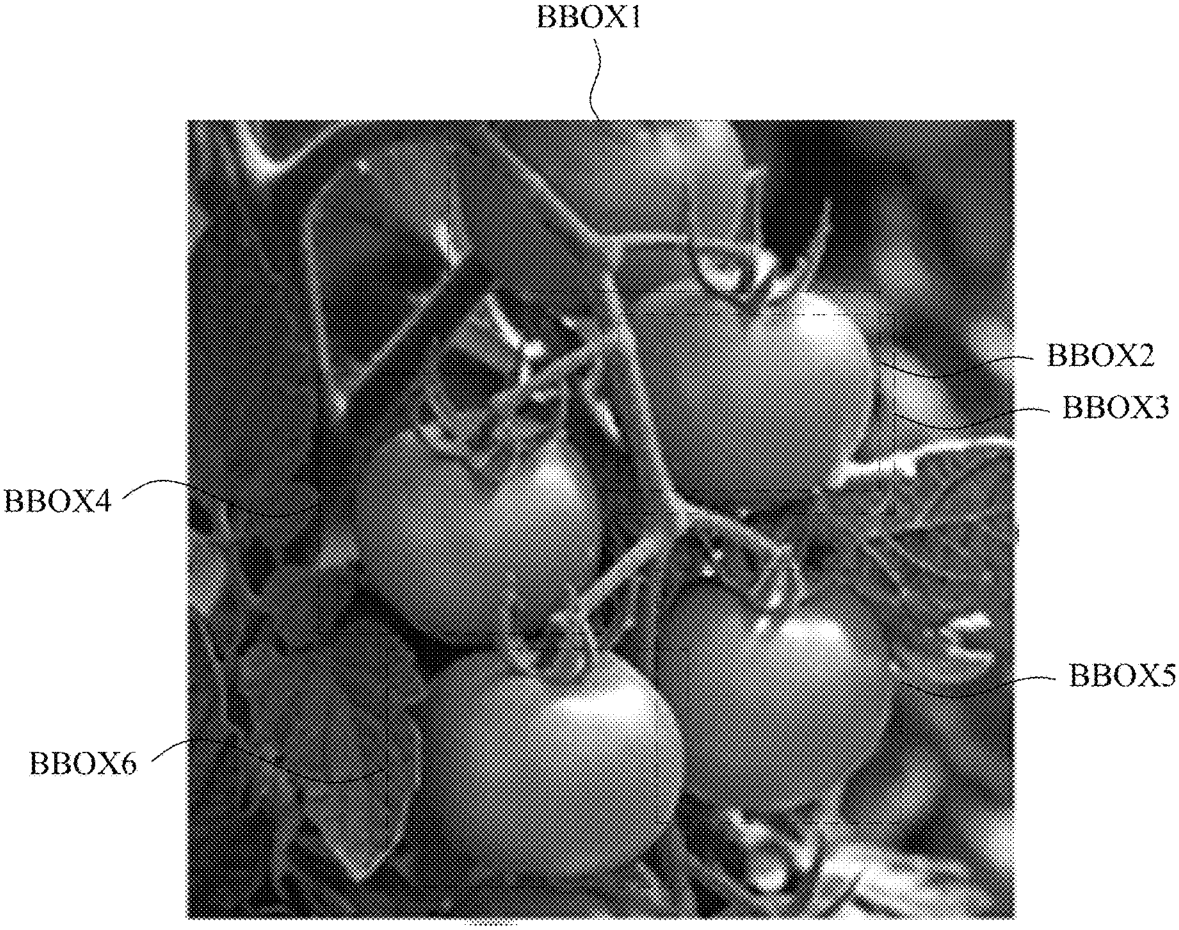
FIG. 3 is a schematic diagram of bounding boxes in an image according to some embodiments of the present disclosure.

The following describes the updating of the bounding boxes in the image with an actual example. Reference is made to FIG. 3, which is a schematic diagram of bounding boxes BBOX1 to BBOX6 in the image img according to some embodiments of the present disclosure. As shown in FIG. 3, the object detection model ODM can be used to generate the multiple bounding boxes BBOX1 to BBOX6 from the image img to be labeled, where the classification labels of the bounding boxes BBOX1 to BBOX6 are all tomatoes.

Assuming that the ratio threshold is set to 0.9, the IOU between the bounding box BBOX2 and the bounding box BBOX3 is 0.92, and the IOU between the bounding box BBOX5 and the bounding box BBOX6 is 0.33, one (can be selected according to the class scores or in a random method) of the bounding box BBOX2 and the bounding box BBOX3 and the corresponding classification label can be deleted, and keep the bounding box BBOX5 and the bounding box BBOX6, so as to update to bounding boxes BBOX1 to BBOX2 and BBOX4 to BBOX6, or update to bounding boxes BBOX1 and BBOX3 to BBOX6.

Through the above-mentioned steps, the image data augmentation method directly utilizes the pre-trained object detection model ODM and the boundary selection method of the overlapping area to generate corresponding labels and corresponding bounding boxes from the image img. In this way, it will solve the problem of labeling images that required a lot of manpower during machine learning in the past.

In addition, the above-mentioned labeled image img can also be used again for pre-training the object detection model ODM, and the labeled image img is updated by the above-mentioned method. The detailed steps are further described below.

Figure 4:
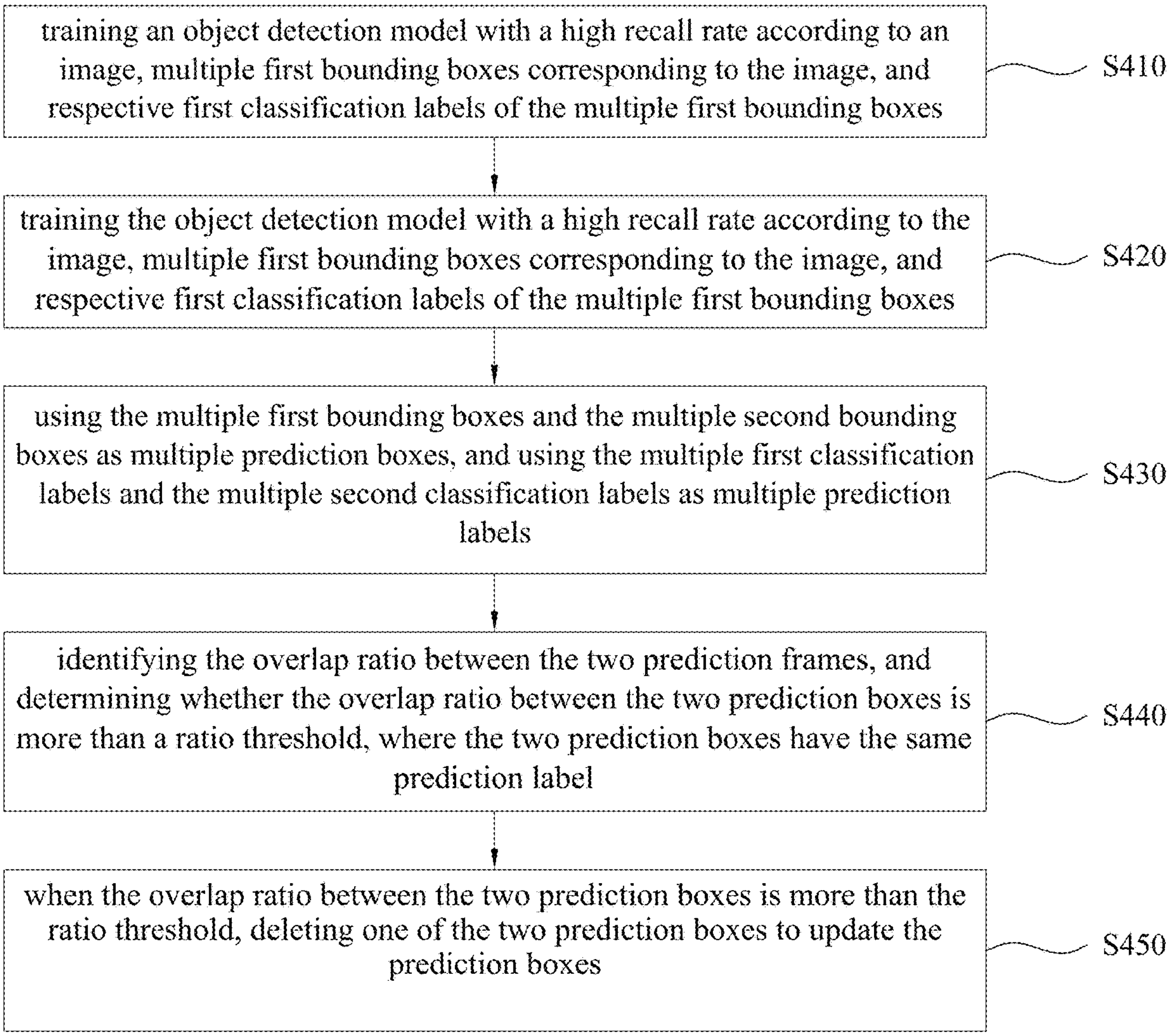
FIG. 4 is a flowchart of the image data augmentation method in some embodiments according to the present disclosure.

Reference is made to FIG. 4, which is a flowchart of the image data augmentation method in some embodiments according to the present disclosure. The method of the embodiment shown in FIG. 4 is applicable to the image data augmentation device 100 of FIG. 1, but is not limited thereto.

In this embodiment, the image data augmentation method includes steps S410-S450, where the steps S410 to S450 are executed by the processor 120. Firstly, in step S410, training the object detection model ODM with the high recall rate according to the image img, multiple first bounding boxes corresponding to the image img and respective first classification labels of the multiple first bounding boxes. Further, an object detection model ODM with the high recall rate is trained in advance by inputting objects according to the image img, the multiple first bounding boxes corresponding to the image img, and the respective first classification labels of the multiple first bounding boxes.

Furthermore, in step S420, using the object detection model ODM to generate multiple second bounding boxes and respective second classification labels of the multiple second bounding boxes from the image img.

Furthermore, in step S430, using the multiple first bounding boxes and the multiple second bounding boxes as multiple prediction boxes, and using the multiple first classification labels and the multiple second classification labels as multiple prediction labels.

Furthermore, in step S440, identifying the overlap ratio between the two prediction boxes, and determining whether the overlap ratio between the two prediction boxes is more than a ratio threshold, where the two prediction boxes have the same prediction label. In some embodiments, the overlapping area between the two prediction boxes with the same prediction label can be identified to calculate the IOU of the overlapping area, so as to use the IOU as the overlap ratio. In some embodiments, the ratio threshold can be the IOU threshold.

Furthermore, in step S450, when the overlap ratio between the two prediction boxes is more than the ratio threshold, deleting one of the two prediction boxes to update the prediction boxes.

In some embodiments, the class scores of the two prediction boxes can be compared, and the prediction box with the smaller class score may be deleted, where the class score indicates the probability that the corresponding prediction box is classified as the object of the predicted label of the corresponding prediction box. In other embodiments, one of the two prediction boxes can be randomly selected, and the one of the two prediction boxes can be deleted.

In other words, the update of the prediction box here is also updated by the method of updating the bounding box as shown in FIG. 3.

By the above-mentioned steps, the image data augmentation method directly utilizes the labeled image img to pre-train the object detection model ODM with the high recall rate, and utilizes the trained object detection model ODM and the boundary selection method of the overlapping area to update the corresponding label and the corresponding bounding box in the image img. In this way, the accuracy of labeling will be greatly improved, and the problem of labeling images that required a lot of manpower during machine learning in the past will be solved.

In addition, the above-mentioned labeled image img can be used again to pre-train the object detection model ODM, the labeled image img is updated by the above-mentioned method, and the object detection model ODM can be further updated by using the labeled image img, and the labeled image img is continuously updated by the above-mentioned method. In addition, the trained object detection model ODM can be further retrained. The detailed steps are further explained below.

Figure 5:
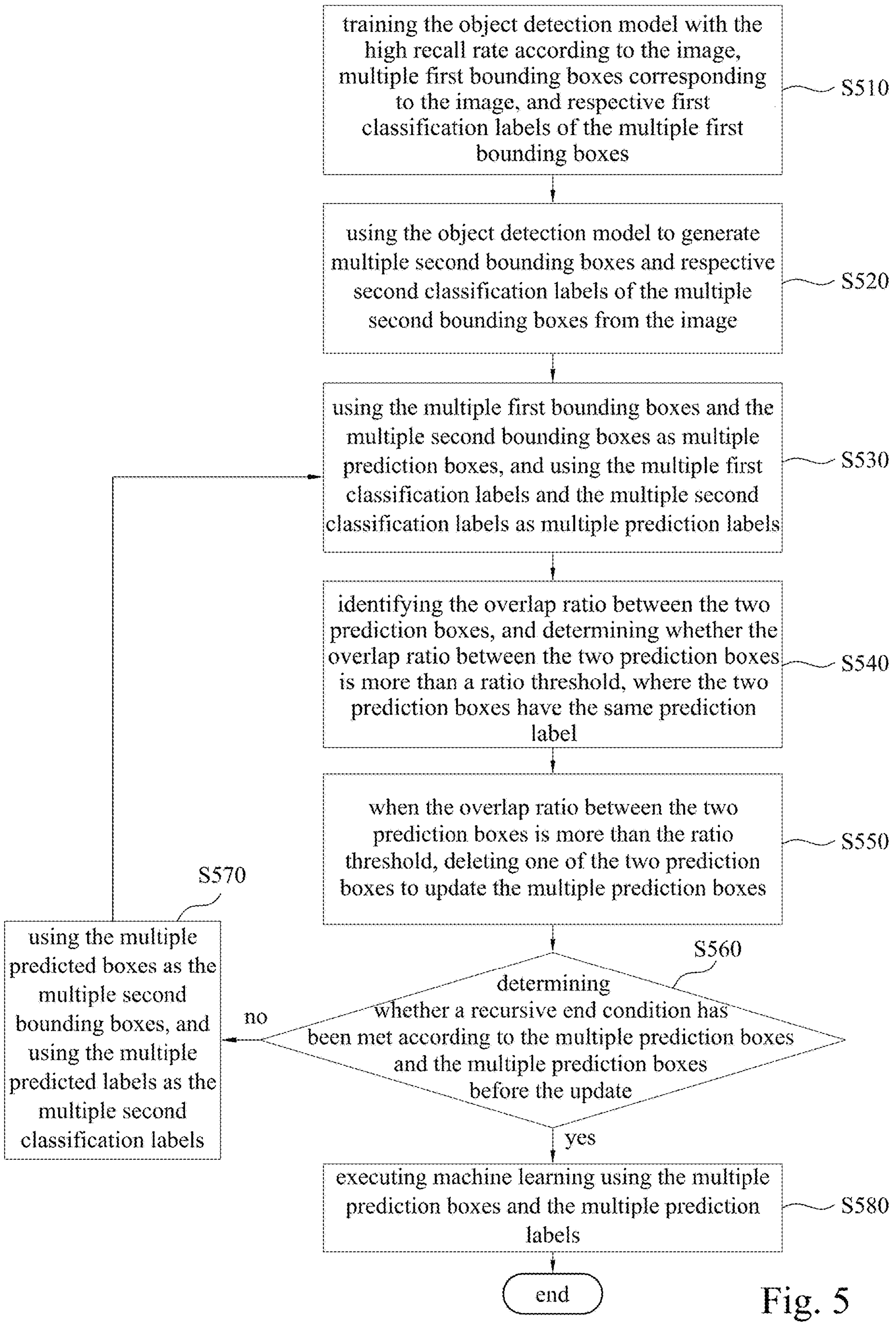
FIG. 5 is a flowchart of the image data augmentation method according to other embodiments of the present disclosure.

Reference is made to FIG. 5, which is a flowchart of the image data augmentation method according to other embodiments of the present disclosure. The method of the embodiment shown in FIG. 5 is applicable to the image data augmentation device 100 of FIG. 1, but is not limited thereto.

In this embodiment, the image data augmentation method includes steps S510 to S580, where the steps S510-S580 are executed by the processor 120. It should be noted that steps S510 to S550 are basically similar to the above-mentioned steps S410 to S450, so only different steps will be described here, and the same parts will not be repeated.

Firstly, in step S560, determining whether a recursive end condition has been met according to the multiple prediction boxes and the multiple prediction boxes before the update. When the recursion end condition is not met, enter to step S570. Conversely, when the recursion end condition has been met, enter to step S580.

In some embodiments, a similarity between the multiple prediction boxes and the multiple prediction boxes before the update can be calculated, and it is determined whether the similarity is more than a similarity threshold. Next, when determining that the similarity is more than the similarity threshold, it is determined that the recursive end condition has been met. Conversely, when determining that the similarity is not more than the similarity threshold, it is determined that the recursion end condition is not met.

In some embodiments, the IOU (e.g., dividing the sum of all intersection regions by the entire union region) between the multiple prediction boxes and the multiple prediction boxes before the update can be calculated, and it is used this IOU as the similarity. Next, an IOU threshold (which may be tested by past experiments or artificially set) can be set as the similarity threshold, and it is determined whether the similarity is more than the similarity threshold.

Furthermore, in step S570, using the multiple predicted boxes as the multiple second bounding boxes, and using the multiple predicted labels as the multiple second classification labels, so as to enter to step S530.

In some embodiments, the similarity between the multiple prediction boxes and the multiple first bounding boxes can be calculated, and it is determined whether the similarity is less than the similarity threshold. Next, when determining that the similarity is less than the similarity threshold, the object detection model ODM is retrained by using the image, the prediction boxes and the prediction labels, so as to enter to step S520. In other words, when it is found that the difference between the prediction box and the first bounding box is too large, the object detection model ODM can be updated.

In some embodiments, the IOU (e.g., dividing the sum of all intersection regions by the entire union region) between the prediction boxes and the first bounding boxes can be calculated, and it is used this IOU as the similarity. Next, an IOU threshold (which can also be tested in past experiments or artificially set) can be set as the similarity threshold, and it is determined whether the similarity is more than the similarity threshold. It should be noted that the similarity/similarity threshold here is different from the above-mentioned similarity/similarity threshold between the prediction boxes and the prediction boxes before the update.

Furthermore, in step S580, executing machine learning by using the multiple prediction boxes and the multiple prediction labels. In this way, the updating of the prediction boxes and the prediction labels is stopped.

In summary, the image data augmentation device and method provided by the present disclosure can utilize a pre-trained object detection model to generate the labels and the bounding boxes to be updated, and update these labels and these bounding boxes according to the overlap ratio between the bounding boxes. In addition, the bounding boxes can be further updated according to the overlap ratio between the bounding boxes and the bounding boxes previously generated by the object detection model. On the other hand, when it is found that the difference between the updated bounding boxes and the bounding boxes generated by the object detection model is too large, the object detection model can be further updated. In this way, the accuracy of labeling will be greatly improved, and the problem of labeling images that required a lot of manpower during machine learning in the past will be solved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image data augmentation method, comprising:

(a) training an object detection model with a high recall rate according to an image, a plurality of first bounding boxes corresponding to the image, and respective first classification labels of the plurality of first bounding boxes;

(b) using the object detection model to generate a plurality of second bounding boxes and respective second classification labels of the plurality of second bounding boxes from the image;

(c) using the plurality of first bounding boxes and the plurality of second bounding boxes as a plurality of prediction boxes, and using a plurality of first classification labels and a plurality of second classification labels as a plurality of prediction labels;

(d) identifying an overlap ratio between the two prediction boxes, and determining whether the overlap ratio between the two prediction boxes is more than a ratio threshold, wherein the two prediction boxes have the same prediction label;

(e) when the overlap ratio between the two prediction boxes is more than the ratio threshold, deleting one of the two prediction boxes to update the plurality of prediction boxes;

(f) determining whether a recursive end condition has been met according to the plurality of prediction boxes and the plurality of prediction boxes before the update;

(g) when the recursive end condition has been met, using the plurality of prediction boxes and the plurality of prediction labels for executing machine learning; and (h) when the recursive end condition is not met, using the plurality of predicted boxes as the plurality of second bounding boxes, and using the plurality of predicted labels as a plurality of second classification labels, so as to execute steps (c) to step (f).

2. The image data augmentation method of claim 1, wherein step (e) comprises:

comparing classification scores of the two bounding boxes, and deleting the bounding box with the classification score which is smaller, wherein the object detection model is a faster region convolutional neural network or a YOLO network, and the classification score indicates a probability that the corresponding bounding box is classified as an object of the classification label of the corresponding bounding box.

3. The image data augmentation method of claim 1, wherein step (f) comprises:

(f1) calculating a similarity between the plurality of prediction boxes and the plurality of prediction boxes before the update, and determining whether the similarity is more than a similarity threshold;

(f2) when determining that the similarity is more than the similarity threshold, determining that the recursive end condition has been met; and (f3) when determining that the similarity is not more than the similarity threshold, determining that the recursive end condition is not met.

4. The image data augmentation method of claim 1, wherein step (h) comprises:

(h1) calculating a similarity between the plurality of prediction boxes and the plurality of first bounding boxes, and determining whether the similarity is less than a similarity threshold; and (h2) when determining that the similarity is less than the similarity threshold, using the image, the plurality of prediction boxes and the plurality of prediction labels for retraining the object detection model, so as to execute steps (b) to (f) again.

5. The image data augmentation method of claim 1, further comprising:

randomly selecting the one of the two bounding boxes, and deleting the one of the two bounding boxes.

* * * * *